United States Patent
Nebesnyi

(10) Patent No.: US 9,645,604 B1
(45) Date of Patent: May 9, 2017

(54) CIRCUITS AND TECHNIQUES FOR MESOCHRONOUS PROCESSING

(71) Applicant: Bitfury Group Limited, George Town, Grand Cayman (KY)

(72) Inventor: Valerii Nebesnyi, Kiev (UA)

(73) Assignees: Bitfury Group Limited (KY); Valerijs Vavilovs (LV)

( * ) Notice: Subject to any disclaimer, the term of this patent is extended or adjusted under 35 U.S.C. 154(b) by 0 days.

(21) Appl. No.: 14/988,658

(22) Filed: Jan. 5, 2016

(51) Int. Cl.
*G06F 1/12* (2006.01)
*G06F 1/06* (2006.01)

(52) U.S. Cl.
CPC . *G06F 1/12* (2013.01); *G06F 1/06* (2013.01)

(58) Field of Classification Search
None
See application file for complete search history.

(56) References Cited

U.S. PATENT DOCUMENTS

| | | | |
|---|---|---|---|
| 5,867,040 A | 2/1999 | Fuse et al. | |
| 6,097,811 A | 8/2000 | Micali | |
| 6,479,974 B2 | 11/2002 | Cohn et al. | |
| 6,657,474 B2 | 12/2003 | Varadarajan | |
| 6,774,721 B1 * | 8/2004 | Popescu | H03K 5/003 326/115 |
| 7,193,443 B1 | 3/2007 | Smith et al. | |
| 7,236,518 B2 | 6/2007 | Bazes | |
| 7,329,968 B2 | 2/2008 | Shepard et al. | |
| 7,373,527 B2 | 5/2008 | Chapuis | |
| 7,493,504 B2 | 2/2009 | Chapuis | |
| 7,562,326 B2 | 7/2009 | Wang et al. | |
| 7,594,127 B2 | 9/2009 | Sutardja | |
| 7,643,591 B2 | 1/2010 | Arsovski et al. | |
| 7,702,929 B2 | 4/2010 | Sutardja | |
| 7,707,521 B2 | 4/2010 | Tsai et al. | |
| 7,710,192 B2 | 5/2010 | Kaeslin et al. | |
| 7,788,509 B2 | 8/2010 | Sutardja | |

(Continued)

FOREIGN PATENT DOCUMENTS

| | | |
|---|---|---|
| WO | WO-2014/201059 A1 | 12/2014 |
| WO | WO-2015/077378 A1 | 5/2015 |

(Continued)

OTHER PUBLICATIONS

Paul D. Franzon, ECE 733 Class Notes: Latches and Flip Flops (2012), available at http://www.ece.ncsu.edu/asic/ece733/2013/docs/FlipFlops.pdf, pp. 1-81.

(Continued)

*Primary Examiner* — Nitin Patel
(74) *Attorney, Agent, or Firm* — Goodwin Procter LLP

(57) ABSTRACT

Circuits and techniques for mesochronous processing are provided. A communication method for a mesochronously clocked system may include synchronizing processing of first and second processing units to first and second mesochronous clock signals, respectively. The first and second mesochronous clock signals may have a same frequency and different phases, respectively. The method may further include sending data from the first processing unit to the second processing unit, and enabling or disabling receipt of the data by the second processing unit based, at least in part, on states of the first and second mesochronous clock signals.

30 Claims, 7 Drawing Sheets

(56) References Cited

U.S. PATENT DOCUMENTS

| | | | |
|---|---|---|---|
| 7,788,510 | B2 | 8/2010 | Sutardja |
| 7,823,107 | B2 | 10/2010 | Arsovski et al. |
| 7,937,605 | B2 | 5/2011 | Rea et al. |
| 8,122,279 | B2 | 2/2012 | Yamaoka |
| 8,166,286 | B2 | 4/2012 | Frank et al. |
| 8,169,257 | B2 | 5/2012 | Pelley |
| 8,174,288 | B2 | 5/2012 | Dennard et al. |
| 8,274,319 | B2 | 9/2012 | Maeno |
| 8,605,845 | B2 | 12/2013 | Chen et al. |
| 8,624,646 | B1 | 1/2014 | Bazes |
| 8,742,464 | B2 | 6/2014 | Sherlekar et al. |
| 8,754,672 | B2 | 6/2014 | Dennard et al. |
| 8,797,084 | B2 | 8/2014 | Friedman et al. |
| 8,836,379 | B2 | 9/2014 | Guntur et al. |
| 8,856,704 | B2 | 10/2014 | Baeg |
| 8,875,082 | B1* | 10/2014 | Sircar ............ 716/110 |
| 8,878,387 | B1 | 11/2014 | Wong et al. |
| 8,918,667 | B2 | 12/2014 | Ware et al. |
| 8,941,150 | B2 | 1/2015 | Sherlekar et al. |
| 9,008,251 | B2 | 4/2015 | Chen et al. |
| 9,048,820 | B2 | 6/2015 | Shi et al. |
| 9,158,877 | B2 | 10/2015 | Hsieh et al. |
| 9,197,090 | B2 | 11/2015 | Chao et al. |
| 9,207,695 | B2 | 12/2015 | Friedman et al. |
| 2004/0076189 | A1 | 4/2004 | Boerstler et al. |
| 2008/0061835 | A1* | 3/2008 | Locatelli ......... H04L 7/0012 326/93 |
| 2008/0116943 | A1 | 5/2008 | Nair |
| 2008/0246511 | A1 | 10/2008 | Miura et al. |
| 2009/0044163 | A1 | 2/2009 | Wang et al. |
| 2011/0145137 | A1 | 6/2011 | Driemeyer et al. |
| 2011/0246774 | A1 | 10/2011 | Phillips, II et al. |
| 2011/0307659 | A1 | 12/2011 | Hans et al. |
| 2013/0032885 | A1 | 2/2013 | Swamynathan et al. |
| 2014/0258765 | A1 | 9/2014 | Persson |
| 2014/0327081 | A1 | 11/2014 | Hsieh et al. |
| 2015/0015314 | A1* | 1/2015 | Dally ............. H03L 7/00 327/160 |
| 2015/0168973 | A1 | 6/2015 | Barber |
| 2015/0294308 | A1 | 10/2015 | Pauker et al. |
| 2015/0370947 | A1 | 12/2015 | Moroz et al. |

FOREIGN PATENT DOCUMENTS

| | | |
|---|---|---|
| WO | WO-2015/095367 A2 | 6/2015 |
| WO | WO-2015/160565 A1 | 10/2015 |

OTHER PUBLICATIONS

Daniel Wiklund, Mesochronous clocking and communication in on-chip networks, Proc. Swedish System-on-Chip Conf. (Apr. 2003), 4 pages.

J.M. Rabaey et al., Digital Integrated Circuits: A Design Perspective, Second Edition (2003), pp. 346-349 and 519-534.

* cited by examiner

CIRCUITS AND TECHNIQUES FOR MESOCHRONOUS PROCESSING

FIELD OF INVENTION

The present disclosure relates generally to circuits and techniques for mesochronous processing. Some embodiments relate particularly to communicating data between processing units that have clock signals with different phases.

BACKGROUND

Clock signals can be used to coordinate data transmission between components in an electronic system, for example, between circuits in an integrated circuit ("IC" or "chip"), or between chips on a printed circuit board (PCB). In a synchronous system, components of the system are synchronized to a system-wide clock. The components perform data processing and transmission in cadence with the system-wide clock at a particular time period during the clock cycle of the system-wide clock. For example, the components can be synchronized with the system-wide clock when the clock signal is "high" (e.g., at a supply voltage), or when the clock signal is "low" (e.g., at a reference voltage). As another example, the components can be synchronized with the system-wide clock at a clock "edge," for example, when the clock signal transitions from low to high ("rising edge"), or from high to low ("falling edge").

A latch circuit can be used for storing data. For example, a latch can store a single bit ("0" or "1") or multiple bits. Data can be provided to an input of a latch to be stored in the latch. Data stored in a latch can be read out from an output of the latch. Some latches can selectively operate in an enabled ("transparent") state or in a disabled ("hold") state based on the state of a control signal. When the latch is in the transparent state, the latch is ready to receive new data at the input, and the output of the latch is operable to reflect the input of the latch. When in the transparent state, the latch may not be ready for providing (transmitting) data to another circuit as the output of the latch may not be stable (e.g., depending on the state of the input data). When the latch is in the hold state, data previously stored in the latch is stable (e.g., ready for read-out), and can be transmitted to another circuit coupled to the output of the latch. A latch performs "positive latching" if the latch enters the hold state when the enabling signal is high. A latch performs "negative latching" if the latch enters the hold state when the enabling signal is low.

SUMMARY OF THE INVENTION

According to an aspect of the present disclosure, an integrated circuit including a plurality of processing units is provided. The processing units are operable to synchronize respective processing to a respective plurality of mesochronous clock signals. The mesochronous clock signals include a first clock signal and a second clock signal. The first and second clock signals have a same frequency and different phases, respectively. The processing units include a first processing unit operable to synchronize processing to the first clock signal and a second processing unit operable to synchronize processing to the second clock signal. The second processing unit includes a latch circuit coupled to receive data from the first processing unit. The latch circuit is configured to operate based on states of the first and second clock signals.

In some embodiments, the first processing unit includes a latch circuit coupled to provide the data to the latch circuit of the second processing unit. In some embodiments, the latch circuit of the second processing unit is configured to operate in a transparent state based, at least in part, on the latch circuit of the first processing unit being in a holding state. In some embodiments, the latch circuit of the second processing unit is configured to operate in a transparent state based, at least in part, on the latch circuit of the first processing unit being in a holding state and the second clock signal representing a particular logical value. In some embodiments, the latch circuit of the second processing unit is configured to operate in a holding state based, at least in part, on the latch circuit of the first processing unit being in a transparent state and/or the second clock signal representing a logical value different from the particular logical value.

In some embodiments, the latch circuit of the first processing unit is configured to operate in a holding state based on the first clock signal representing a particular logical value, and the latch circuit of the second processing unit is configured to operate in a transparent state based, at least in part, on the first clock signal representing the particular logical value. In some embodiments, the latch circuit of the first processing unit is configured to operate in a holding state based on the first clock signal representing a first logical value, and the latch circuit of the second processing unit is configured to operate in a transparent state based, at least in part, on the first clock signal representing the first logical value and the second clock signal representing a second logical value. In some embodiments, the latch circuit of the second processing unit is configured to operate in a holding state based, at least in part, on the first clock signal representing a logical value different from the first logical value and/or the second clock signal representing a logical value different from the second logical value.

In some embodiments, the first clock signal is a first single-ended clock signal, and the second clock signal is a second single-ended clock signal. In some embodiments, the latch circuit includes a gated latch having an input data terminal, an enable terminal, and one or more output terminals, wherein the input data terminal is configured to receive data from the first processing unit, and wherein the enable terminal is configured to receive a logical AND of the first single-ended clock signal and an inverse of the second single-ended clock signal.

In some embodiments, the first clock signal is a first differential clock signal including a first differential signal pair, and the second clock signal is a second differential clock signal including a second differential signal pair. In some embodiments, the latch circuit includes an input circuit and a buffer circuit, and the input circuit includes a first plurality of field effect transistors (FETs) of a first type including first, second, and third FETs having diffusion terminals coupled in series between a first power supply rail and an input node of the buffer circuit. In some embodiments, the latch circuit further includes a second plurality of field effect transistors (FETs) of a second type including fourth, fifth, and sixth FETs having diffusion terminals coupled in series between a second power supply rail and the input node of the buffer circuit. In some embodiments, gates of the first and fourth FETs are coupled to receive the data from the first processing unit. In some embodiments, gates of the second and fifth FETs are coupled to receive first and second signals of the first differential signal pair, respectively. In some embodiments, gates of the third and sixth FETs are coupled to receive first and second signals of the second differential signal pair, respectively. In some embodiments, the buffer circuit includes at least one inverter having an input terminal coupled to the input node of the buffer circuit and an output terminal coupled to an output terminal of the latch circuit.

In some embodiments, the integrated circuit further includes a differential clock buffer having input terminals coupled to receive the first differential signal pair of the first differential clock signal, wherein the differential clock buffer is operable to provide the second differential signal pair of the second differential clock signal, and wherein the differential clock buffer is operable to set a logical value of the second differential signal pair to match a logical value of the first differential signal pair in response to a transition of a first signal of the first differential signal pair and a complementary transition of a second signal of the first differential signal pair.

In some embodiments, the integrated circuit includes a processing node, wherein the processing node includes the plurality of processing units, a control unit, and a bus, and wherein the processing units are communicatively coupled to the control unit by the bus. In some embodiments, the control unit is operable to transmit operand data to the processing units via the bus. In some embodiments, the processing units are operable to transmit result data to the control unit via the bus. In some embodiments, the integrated circuit includes a plurality of processing nodes including the processing node. In some embodiments, the processing nodes perform bitcoin mining operations.

According to another aspect of the present disclosure, a latch circuit including a buffer circuit and an input circuit is provided. The buffer circuit has an input node and an output node. The input circuit has an output node coupled to the input node of the buffer circuit, a data node coupled to receive an input data signal, and first and second enable nodes coupled to receive first and second mesochronous clock signals, respectively, of first and second processing units, respectively. The first and second clock signals have a same frequency and different phases, respectively. The input circuit is operable to enable the latch circuit based on states of the first and second mesochronous clock signals.

In some embodiments, the data node is coupled to receive the input data signal from an output latch of the first processing unit. In some embodiments, the input circuit is configured to enable the latch circuit based, at least in part, on the output latch being in a disabled state. In some embodiments, the input circuit is configured to enable the latch circuit based, at least in part, on the output latch being in a disabled state and the second clock signal representing a particular logical value. In some embodiments, the input circuit is configured to disable the latch circuit based, at least in part, on the output latch being in an enabled state and/or the second clock signal representing a logical value different from the particular logical value.

In some embodiments, the output latch is configured to operate in a disabled state based on the first clock signal representing a particular logical value, and the input circuit is configured enable the latch circuit based, at least in part, on the first clock signal representing the particular logical value. In some embodiments, the output latch is configured to operate in a disabled state based on the first clock signal representing a first logical value, and the input circuit is configured to enable the latch circuit based, at least in part, on the first clock signal representing the first logical value and the second clock signal representing a second logical value. In some embodiments, the input circuit is configured to disable the latch circuit based, at least in part, on the first clock signal representing a logical value different from the first logical value and/or the second clock signal representing a logical value different from the second logical value.

In some embodiments, the first clock signal is a first differential clock signal including a first differential signal pair, and the second clock signal is a second differential clock signal including a second differential signal pair. In some embodiments, the input circuit includes a first plurality of field effect transistors (FETs) of a first type including first, second, and third FETs having diffusion terminals coupled in series between a first power supply rail and the input node of the buffer circuit. In some embodiments, the input circuit further includes a second plurality of field effect transistors (FETs) of a second type including fourth, fifth, and sixth FETs having diffusion terminals coupled in series between a second power supply rail and the input node of the buffer circuit. In some embodiments, gates of the first and fourth FETs are coupled to receive the input data signal. In some embodiments, gates of the second and fifth FETs are coupled to receive first and second signals of the first differential signal pair, respectively. In some embodiments, gates of the third and sixth FETs are coupled to receive first and second signals of the second differential signal pair, respectively. In some embodiments, the buffer circuit includes at least one inverter having an input terminal coupled to the input node of the buffer circuit and an output terminal coupled to the output node of the buffer circuit.

According to yet another aspect of the present disclosure a communication method for a mesochronously clocked system is provided. The method includes synchronizing processing of first and second processing units to first and second mesochronous clock signals, respectively, the first and second mesochronous clock signals having a same frequency and different phases, respectively. The method further includes sending data from the first processing unit to the second processing unit. The method further includes enabling or disabling receipt of the data by the second processing unit based, at least in part, on states of the first and second mesochronous clock signals.

In some embodiments, enabling or disabling receipt of the data by the second processing unit based on states of the first and second mesochronous clock signals includes enabling receipt of the data by the second processing unit based, at least in part, on an output latch of the first processing unit being disabled. In some embodiments, enabling or disabling receipt of the data by the second processing unit based on states of the first and second mesochronous clock signals includes enabling receipt of the data by the second processing unit based, at least in part, on an output latch of the first processing unit being disabled and the second clock signal representing a particular logical value. In some embodiments, enabling or disabling receipt of the data by the second processing unit based on states of the first and second mesochronous clock signals further includes disabling receipt of the data by the second processing unit based, at least in part, on the output latch of the first processing unit being in an enabled state and/or the second clock signal representing a logical value different from the particular logical value.

In some embodiments, the method further includes disabling an output latch of the first processing unit based on the first clock signal representing a particular logical value, wherein enabling or disabling receipt of the data by the second processing unit based on states of the first and second mesochronous clock signals includes enabling receipt of the data by the second processing unit based, at least in part, on the first clock signal representing the particular logical value. In some embodiments, the method further includes disabling an output latch of the first processing unit based on the first clock signal representing a first logical value, wherein enabling or disabling receipt of the data by the second processing unit based on states of the first and second mesochronous clock signals includes enabling receipt of the data by the second processing unit based, at least in part, on the first clock signal representing the first logical value and the second clock signal representing a second logical value. In some embodiments, enabling or disabling receipt of the data by the second processing unit based on states of the first and second mesochronous clock signals further includes disabling receipt of the data by the second processing unit based, at least in part, on the first clock signal representing a logical value different from the first logical value and/or the second clock signal representing a logical value different from the second logical value.

In some embodiments, the first mesochronous clock signal is a first differential clock signal including a first differential signal pair, and the second mesochronous clock signal is a second differential clock signal including a second differential signal pair. In some embodiments, the method further includes generating the second differential signal pair of the second differential clock signal, including setting a logical value of the second differential signal pair to match a logical value of the first differential signal pair in response to a transition of a first signal of the first differential signal pair and a complementary transition of a second signal of the first differential signal pair.

According to yet another aspect of the present disclosure, a computer-implemented electronic design automation method is provided. The method includes synthesizing a circuit schematic of a portion of a mesochronous system. The mesochronous system includes a plurality of processing units operable to synchronize respective processing to a respective plurality of mesochronous clock signals. The mesochronous clock signals include first and second clock signals having a same frequency and different phases, respectively. The processing units include a first processing unit operable to synchronize processing to the first clock signal and a second processing unit operable to synchronize processing to the second clock signal. The second processing unit is coupled to receive data from the first processing unit. Synthesizing the circuit schematic includes generating a schematic of a latch circuit of the second processing unit. The latch circuit is coupled to receive data from the first processing unit and configured to operate based on states of the first and second clock signals.

In some embodiments, the method further includes simulating, by a computer, operation of the circuit schematic, including simulating operation of the latch circuit. In some embodiments, the method further includes generating, by a computer, a physical layout of the circuit schematic. In some embodiments, the method further includes generating, by a computer, a plurality of mask patterns for fabricating an integrated circuit including the latch circuit.

Other aspects and advantages of some embodiments will become apparent from the following drawings, detailed description, and claims, all of which illustrate the principles of some embodiments, by way of example only.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
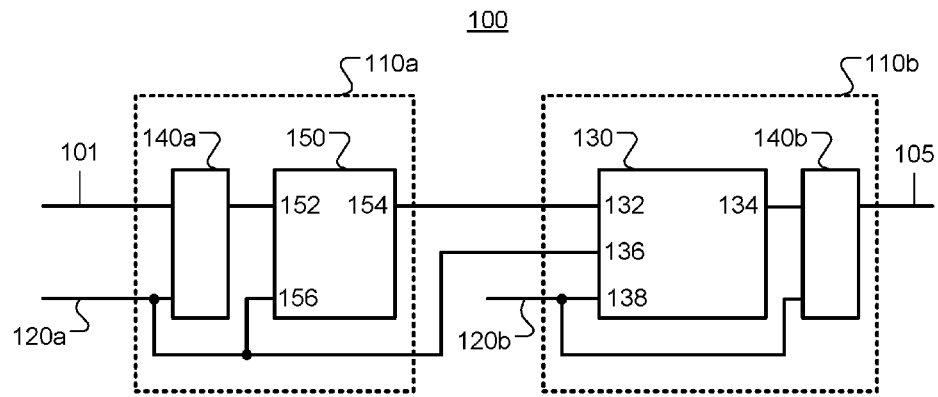
FIG. 1 is a block diagram of a mesochronous system, according to some embodiments.

Mesochronous processing can, in some cases, provide advantages over synchronous processing. As described above, processing units in a synchronous system are synchronized to a system-wide clock, such that the processing units perform data processing and transmission operations in cadence with that clock. Since different processing units are synchronized to the same clock signal, processing units can generally exchange data using conventional latches synchronized to the shared clock. However, the current drawn by a synchronous system can increase very rapidly at certain points during the clock cycle of the system-wide clock (e.g., at the rising edge of each clock cycle, for systems that are synchronized to the rising clock edge). This rapid change in the current drawn by the system ("current spike") can cause electromagnetic interference and/or noise in the power supply, which can have undesirable effects on the operation of synchronous systems, particularly systems with high clock frequencies and/or low power supply voltages. Furthermore, the amplitude of the current drawn during a current spike can be significantly higher than the synchronous system's average current load, which means that the maximum load on the system's power supply can be much greater than the average load on the power supply. Since the design of a synchronous system's power supply is generally determined by the maximum load rather than the average load, accommodating such current spikes can significantly increase the bulk and expense of a synchronous system's power supply.

By contrast, processing units in a mesochronous system are synchronized to mesochronous clock signals, which have the same frequency but different phases. For example, in a mesochronous system, processing units $P_A$ and $P_B$ can be synchronized to rising edges of clock signals $C_A$ and $C_B$, respectively, where clock signals $C_A$ and $C_B$ have substantially the same frequency, but the rising edges of clock signal $C_B$ are offset relative to the rising edges of clock signal $C_A$. Since the processing and data transmission operations performed by processing units $P_A$ and $P_B$ are synchronized to occur at different times, the peak current loads of the processing units may occur at different times, rather than occurring at the same time. Thus, the current load in a mesochronous system can be more uniformly distributed over the entire clock cycle than the current load of a comparable synchronous system, and the undesirable side effects associated with current spikes in synchronous systems (e.g., electromagnetic interference, power supply noise, etc.) can be less significant in mesochronous systems. Furthermore, the maximum load on the power supply of a mesochronous system can be significantly lower than the maximum load on the power supply of a comparable synchronous system, thereby allowing the mesochronous system to use a smaller and/or less expensive power supply.

The potential advantages of mesochronous systems are not limited to reducing the side effects of current spikes. For example, in a synchronous system, the system-wide clock's signal can be degraded and/or skewed at different parts of the system due to clock path parasitics (e.g., resistance and capacitance) and delays, as well as variations in the clock path delays. Synchronizing the system's processing units to a degraded or skewed system-wide clock signal can reduce margins for components of the system to synchronize with the clock. To alleviate clock degradation and skew problems, stronger drivers and repeaters can be used for the system-wide clock. However, the use of strong clock signal drivers and repeaters can increase the system's power consumption and/or cause electrical interference with other signals in the system. By contrast, since mesochronous systems do not require distribution of a system-wide clock signal, such systems are generally less susceptible to problems arising from clock skewing and degradation. Thus, clock distribution for mesochronous systems can generally be implemented with greater efficiency and less power consumption as compared to clock distribution in synchronous systems.

On the other hand, communicating data between processing units that are synchronized to different clock signals can be difficult. Mesochronous circuits generally use specialized data transceivers to communicate data between processing units in different clock domains. Such data transceivers can be large, complex, inefficient, and/or a significant source of power consumption. Thus, there is a need for efficient techniques for communicating data between processing units in different clock domains of a mesochronous system.

The present disclosure describes techniques for efficiently communicating data between processing units in different clock domains of a mesochronous system. A mesochronous system may include a processing unit $P_{TX}$ that uses an output latch $L_{TX}$ to transmit data to another processing unit $P_{RX}$, which receives the data using an input latch $L_{RX}$. The operation of the transmitting processing unit $P_{TX}$ is synchronized to a clock signal $C_{TX}$ (e.g., to the rising edge of $C_{TX}$), and the operation of the receiving processing unit $P_{RX}$ is synchronized to a clock signal $C_{RX}$ (e.g., to the rising edge of $C_{RX}$). The clock signals have substantially the same frequency but different phases. The output latch $L_{TX}$ of the transmitting processing unit $P_{TX}$ is controlled (enabled/disabled) based on the clock signal $C_{TX}$, and the input latch $L_{RX}$ of the receiving processing unit $P_{RX}$ is controlled based on a logical combination of the clock signal $C_{TX}$ and the clock signal $C_{RX}$.

Some embodiments of the above-described technique are effective because the receiver $P_{RX}$ can determine, based on the state of the transmitter's clock signal $C_{TX}$, whether the incoming data from the transmitter $P_{TX}$ is stable, since the transmitter's clock signal $C_{TX}$ controls the transmitter's output latch $L_{TX}$. For example, if the output latch $L_{TX}$ is a positive latch, the receiver $P_{RX}$ can determine that the incoming data from the latch $L_{TX}$ is stable when the transmitter's clock signal $C_{TX}$ is high. In addition, the above-described technique can, in some embodiments, be implemented efficiently and with low complexity by passing the transmitter's clock signal $C_{TX}$ from the transmitting unit $P_{TX}$ to the receiving unit $P_{RX}$ along with the transmitted data. In some embodiments, the receiving processing unit $P_{RX}$ not only uses the transmitter's clock signal $C_{TX}$ to determine when the incoming data from the transmitting unit $P_{TX}$ is stable, but also generates its own clock signal $C_{RX}$ based on the transmitter's clock signal $C_{TX}$.

Particular embodiments of the subject matter described in the present disclosure can be implemented to realize one or more of the above-described advantages.

FIG. 1 is a block diagram of a mesochronous system 100. The mesochronous system 100 includes an input data terminal 101 and an output data terminal 105. The mesochronous system 100 includes a transmitting processing unit 110a and a receiving processing unit 110b. The transmitting processing unit 110a includes a processing circuit 140a. The receiving processing unit 110b includes a processing circuit 140b. The processing circuit 140a is synchronized to a clock signal 120a (e.g., to the rising edge of clock signal 120a). The processing circuit 140b is synchronized to a clock signal 120b (e.g., to the rising edge of the clock signal 120b). The clock signals 120a and 120b can have substantially the same frequency (e.g., identical frequencies or frequencies within 10% of each other) but different phases, as will be described further below. In some embodiments, the frequency of the clock signals 120 may be between approximately 1 MHz and approximately 15 GHz, or between approximately 10 GHz and 15 GHz.

A processing circuit 140 can be a circuit that processes data and/or instructions, for example, an adder, a multiplier, a pre-fetcher, a decoder, or a microprocessor core. Other types of processing units are possible. In some embodiments, a processing circuit performs hashing, or operations of a hash function (e.g., a cryptographic function). Examples of cryptographic hash functions include SHA-2 (Secure Hash Algorithm 2) functions including, but not limited to, SHA-256 and SHA-512. The processing circuit 140a (of the transmitting processing unit 110a) and the processing unit circuit 140b (of the receiving processing unit 110b) can be two instances of the same processing circuit, or of different types of processing circuits.

Since the processing units 110a and 110b are synchronized to clock signals that have different phases, the mesochronous system 100 uses a multi-phase technique to communicate data from the transmitting processing unit 110a to the receiving processing unit 110b. The multi-phase communication technique is implemented by the output latch 150 of the transmitting processing unit 110a and the input latch 130 of the receiving processing unit 110b. Some embodiments of the multi-phase communication technique are described below with reference to FIGS. 2A-2B.

The output latch 150 includes an input data terminal 152 that is coupled to an output data terminal of the processing circuit 140a, an output data terminal 154 that is coupled to the receiving processing unit 110b, and an enable terminal 156 that is coupled to the clock signal 120a. The input latch 130 includes an input data terminal 132 that is coupled to the output data terminal 154 of the output data latch 150 (of the transmitting processing unit 110a), an output data terminal 134 that is coupled to a data input terminal of the processing circuit 140b, an enable terminal 136 that is coupled to the clock signal 120a, and another enable terminal 138 that is coupled to the clock signal 120b.

In the mesochronous system 100, the receiving processing unit 110b receives data from the transmitting processing unit 110a when the output latch 150 is in the hold state, which is determined based on the state of the clock signal 120a that controls the output latch 150. As described below with reference to FIGS. 2A and 2B, the input latch 130 of the receiving processing unit 110b is not enabled to receive data (from the transmitting processing unit 110a) unless the output latch 150 (of the transmitting processing unit 110a) is in the hold state.

Figure 2A:
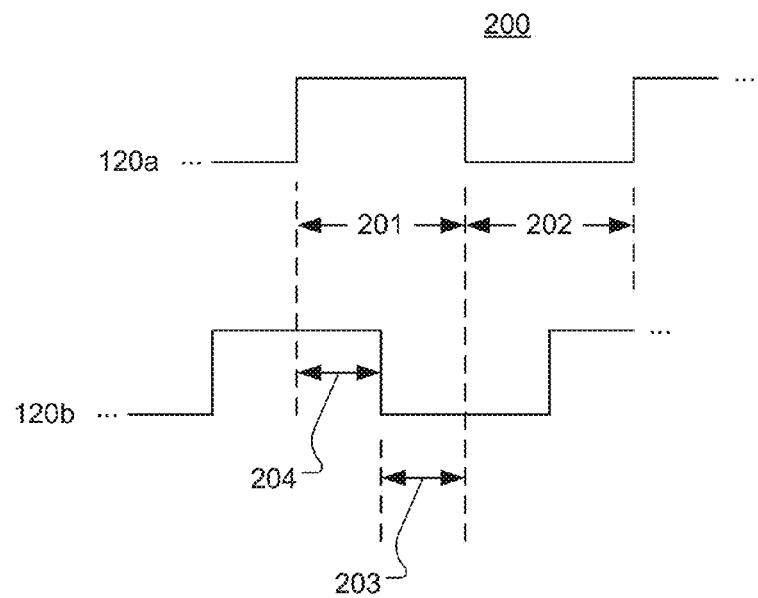
FIG. 2A is an example of a timing diagram of a mesochronous system with a single-ended clock signal, according to some embodiments.

FIG. 2A is an example of a timing diagram 200 of a mesochronous system 100 in which the clock signals 120a and 120b are single-ended signals that have substantially the same frequency but different phases. In the example of FIG. 2A, the rising edge of the clock signal 120b occurs approximately three-quarters of a clock period after the preceding rising edge of the clock signal 120a. Thus, in the example of FIG. 2A, the phase difference between clock signal 120b and clock signal 120a is approximately three-quarters of a clock period.

As described above, the mesochronous system 100 includes a processing circuit 140a that is synchronized to the clock signal 120a and a processing circuit 140b that is synchronized to the clock signal 120b. In some embodiments, the processing circuit 140a is synchronized to the rising edge of the clock signal 120a, such that the processing circuit 140a transmits output data to the input data terminal 152 of the output latch 150 in cadence with the rising edges of the clock signal 120a. In some embodiments, the output latch 150 performs positive latching, such that the output latch is in the hold state when the clock signal 120a is high (e.g., period 201), and is in the transparent state when the clock signal 120a is low (e.g., period 202).

In some embodiments, the processing circuit 140b is synchronized to the rising edge of the clock signal 120b, such that the processing circuit 140b transmits output data on the output terminal 105 (e.g., to another latch) in cadence with the rising edges of the clock signal 120b. In some embodiments, the input latch 130 performs negative latching, such that the input latch 130 is in the transparent state when the latch's enabling condition is true, and is in the hold state when the latch's enabling condition is false. In some embodiments, the enabling condition of the input latch 130 is true (and the latch is in the transparent state) when the clock signal 120a is high and the clock signal 120b is low (e.g., period 203). In some embodiments, the enabling condition of the input latch 130 is false (and the latch 130 is in the hold state) when the clock signal 120a is low or the clock signal 120b is high. In this way, the above-described embodiment of the input latch 130 is in the transparent state (ready to receive new data) when the clock signal 120b is low (indicating that the input latch 130 has already provided the previous data to the processing circuit 140b and is ready to receive new data) and the clock signal 120a is high (indicating the output latch 150 is in the hold state and therefore transmitting the new data to the input latch 130). By contrast, the above-described embodiment of the input latch 130 is in the hold state (not ready to receive new data) when the clock signal 120b is high (indicating that the input latch 130 is still providing the previous data to the processing circuit 140b and is therefore not ready to receive new data) or the clock signal 120a is low (indicating that the output latch 150 is in the transparent state and therefore not ready to transmit the new data).

In some embodiments, the clock signal 120b is generated (e.g., using an inverter) as the inverse of the clock signal 120a with a delay 204. The delay can be a propagation delay (e.g., 50-100 picoseconds in a chip fabricated using a 16 nm process) from the clock input of the processing circuit 140a to the enable input 138 of the input latch 130 (including the delay through the inverter), for example. In this way, the input latch 130 receives data from the output latch 150 (e.g., during the period 203) after the data has been latched by the output latch 150 at the rising edge of the clock signal 120a (e.g., before the period 201), when the output latch 150 is in the hold state (e.g., period 201).

Figure 2B:
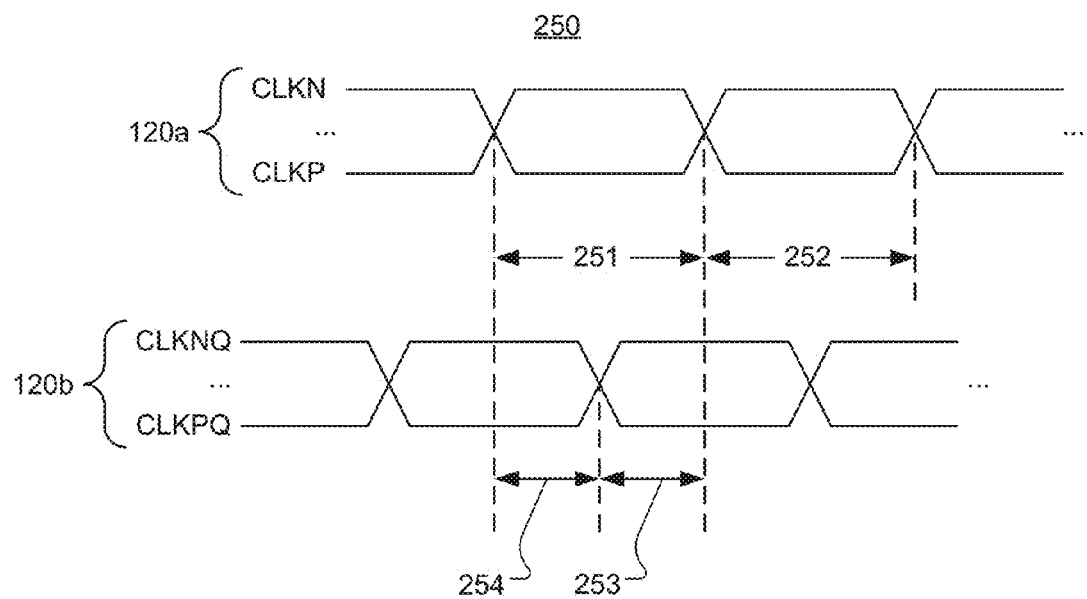
FIG. 2B is an example of a timing diagram of a mesochronous system with differential clock signals, according to some embodiments.

FIG. 2B is an example of a timing diagram 250 of a mesochronous system 100 in which the clock signals 120a and 120b are differential clock signals that have substantially the same frequency but different phases. As can be seen in FIG. 2B, the differential clock signal 120a includes a differential signal pair CLKP and CLKN, and the differential clock signal 120b includes a differential signal pair CLKNQ and CLKPQ. In the example of FIG. 2B, the rising edge of the signal CLKPQ occurs approximately one-quarter of a clock period after the preceding rising edge of the signal CLKP. Thus, in the example of FIG. 2B, the phase difference between clock signal 120b and clock signal 120a is approximately one-quarter of a clock period.

As described above, the mesochronous system 100 includes a processing circuit 140a that is synchronized to the clock signal 120a and a processing circuit 140b that is synchronized to the clock signal 120b. In some embodiments, the processing circuit 140a is synchronized to the rising edge of signal CLKP, such that the processing circuit 140a transmits output data to the input data terminal 152 of the output latch 150 in cadence with the rising edges of the signal CLKP. In some embodiments, the output latch 150 performs positive latching, such that the output latch is in the hold state when signal CLKP is high and signal CLKN is low (e.g., period 251), and is in the transparent state when signal CLKP is low and signal CLKN is high (e.g., period 252).

In some embodiments, the processing circuit 140b is synchronized to the rising edge of signal CLKPQ, such that the processing circuit 140b transmits output data on the output data terminal 105 (e.g., to another latch) in cadence with the rising edges of the signal CLKPQ. In some embodiments, the input latch 130 performs negative latching, such that the input latch 130 is in the transparent state when the latch's enabling condition is true, and is in the hold state when the latch's enabling condition is false. In some embodiments, the enabling condition of the input latch 130 is true (and the latch is in the transparent state) when signal CLKP is high and signal CLKPQ is low (e.g., period 253). In some embodiments, the enabling condition of the input latch 130 is false (and the latch 130 is in the hold state) when signal CLKP is low or signal CLKPQ is high. In this way, the above-described embodiment of the input latch 130 is the transparent state (ready to receive new data) when signal CLKPQ is low (indicating that the input latch 130 has already provided the previous data to the processing circuit 140b and is ready to receive new data) and signal CLKP is high (indicating that the output latch 150 is in the hold state and therefore transmitting the new data to the input latch 130). By contrast, the above-described embodiment of the input latch 130 is in the hold state (not ready to receive new data) when signal CLKPQ is high (indicating that the input latch 130 is still providing the previous data to the processing circuit 140b and is therefore not ready to receive new data) or signal CLKP is low (indicating that the output latch 150 is in the transparent state and therefore not ready to transmit the new data).

Figure 5:
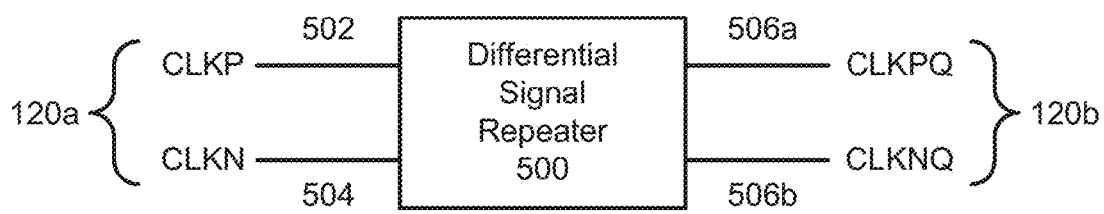
FIG. 5 is a block diagram of a differential signal repeater, according to some embodiments.

As will be described further below with reference to FIG. 5, the differential clock signal 120b can be generated (e.g., using a differential signal repeater) as the inverse of the differential clock signal 120a. The switching of differential clock signal 120b (e.g., the switching of signals CLKNQ and CLKPQ) can occur with a delay 254 relative to the switching of the differential clock signal 120a (e.g., the switching of signal CLKN and/or signal CLKP). The delay 254 can include a propagation delay (e.g., 50-100 ps in a chip fabricated using a 16 nm process) from the clock input of the processing circuit 140a to the enable input 138 of the input latch 130 (including the delay through the differential signal repeater), for example. In this way, the input latch 130 receives data from the output latch 150 (e.g., during the period 253), after the data has been latched by the output latch 150 at the rising edge of the clock signal 120a (e.g., before the period 251), when the output latch 150 is in the hold state (e.g., period 251).

An example has been described in which the processing circuits (140a, 140b) are positive edge triggered, the output latch 150 performs positive latching, and the input latch 130 performs negative latching. In some embodiments, other clocking and latching schemes may be used. For example, the processing circuits (140a, 140b) can be negative edge triggered, the output latch 150 can perform negative latching, and the input latch 130 can perform positive latching. Any suitable combination of positive/negative edge triggered processing units, positive/negative output latches, and/or positive/negative input latches may be used.

In some embodiments, the input latch 130 may latch the input data incorrectly if setup time and/or hold time constraints on the input data are not satisfied. The setup time is a time period just prior to the input latch 130 entering the hold state. The hold time is a time period just after the input latch 130 enters the hold state. The setup time and hold time constraints stipulate that proper latching of the input data is not guaranteed unless the input data is stable during the setup time period and the hold time period. In some embodiments, the phase difference between the clock signals 120a and 120b can be adjusted to ensure that the setup time constraint and/or hold time constraint is satisfied. The phase difference can be adjusted, for example, by increasing or decreasing the delay 204 (or 254). In some embodiments, the delay 204 (or 254) can be increased by inserting an additional delay element between the clock input to the processing unit 140a and the enable input 138 of the input latch 130.

Figure 3:
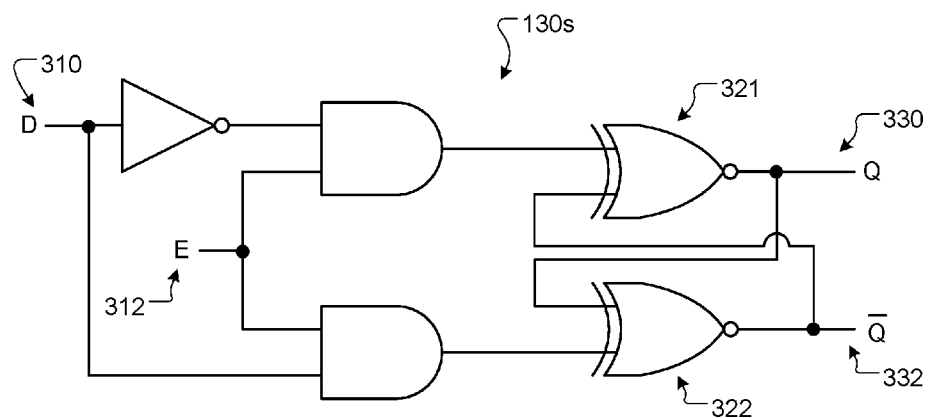
FIG. 3 is a schematic of an input latch for a processing unit of a system with mesochronous single-ended clock signals, according to some embodiments.

FIG. 3 shows an embodiment of an input latch 130s for a receiving processing unit 140b of a system 100 with mesochronous single-ended clock signals. In the example of FIG. 3, the input latch 130s is a gated D latch with a data input terminal 310, an enable input terminal 312, a data output terminal 330 that provides a data output Q that matches the value stored by the latch, and a data output terminal 332 that provides a data output Q' that is the inverse of the value stored by the latch. When the signal (E) at the enable terminal 312 is high, the latch 130s is in the transparent state, such that the input data D is provided to the SR latch (NOR gates 321 and 322 and the couplings there between), which stores the input data D at the output data terminal 330 and stores the inverse of the input data D at the output terminal 332. When the signal (E) at the enable terminal is low, the latch 130s is in the hold state, such that the values on the data output terminals 330 and 332 are maintained even if the input data D changes. In the example of FIG. 3, the SR latch is implemented using NOR gates. In some embodiments, the SR latch is implemented using NAND gates and/or any other suitable circuit components.

In some embodiments, the data input terminal 310 of the D latch is coupled to the data input terminal 132 of the input latch 130s, the non-inverting data output terminal 330 of the D latch is coupled to the data output terminal 134 of the output latch 130s, and the enable terminal 312 of the D latch is coupled to receive a signal that is the logical AND of the clock signal 120a (provided at the enable terminal 136) and the inverse of the clock signal 120b (provided at the enable terminal 138). In this way, the input latch 130s is in the transparent state (e.g., period 203 shown in FIG. 2A) when the clock signal 120a is high and the clock signal 120b is low.

Figure 4:
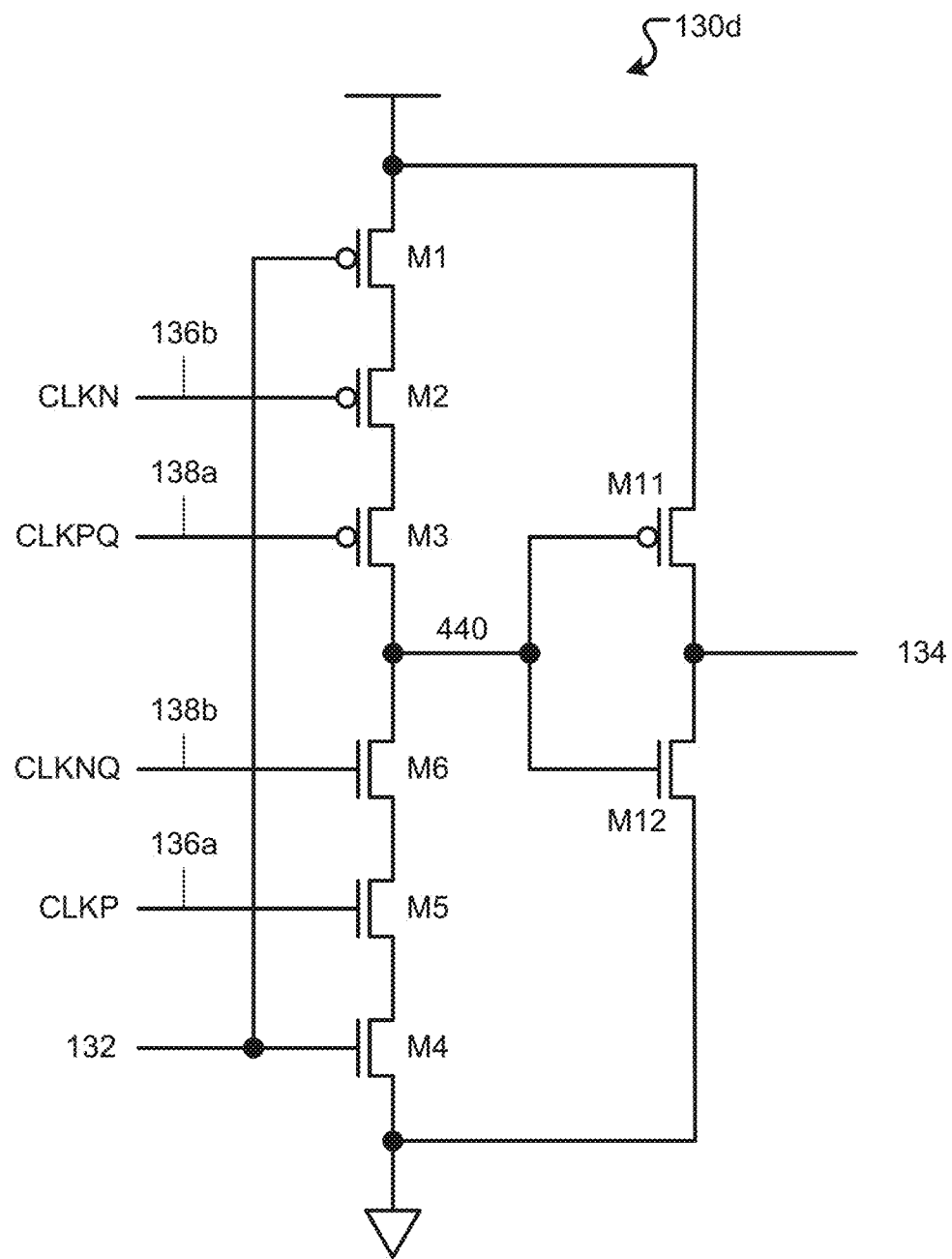
FIG. 4 is a schematic of an input latch for a processing unit of a system with mesochronous differential clock signals, according to some embodiments.

FIG. 4 shows an embodiment of an input latch 130d for a receiving processing unit 140b of a system 100 with mesochronous differential clock signals. Other implementations of the input latch 130 are possible. In the example of FIG. 4, the input latch 130d includes p-type metal-oxide-semiconductor (p-type MOS or PMOS) field effect transistors (FETs) M1, M2, and M3 with diffusion terminals coupled in series between a power supply node and an input node 440 of a buffer circuit. The buffer circuit includes an inverter (FETs M11 and M12) with its input coupled to input node 440 and its output coupled to the latch's output terminal 134. The input latch 130d also includes n-type MOSFETs M4, M5, and M6 with diffusion terminals coupled in series between the input node 440 and a reference (ground) node.

In the example of FIG. 4, the gate terminals of the n-type FET M4 and p-type FET M1 are coupled to receive data (at input data terminal 132) from the output latch 150 of the transmitting processing unit 110a. The gate terminals of the n-type FET M5 and the p-type FET M2 are coupled (at enable terminal 136) to receive the components of the differential clock signal 120a (e.g., signals CLKP and CLKN, respectively). The gate terminals of the n-type FET M6 and the p-type FET M3 are coupled (at enable terminal 138) to receive the components of the differential clock signal 120b (e.g., signals CLKNQ and CLKPQ, respectively).

The input latch 130d operates to implement the above-described functionality of the input latch 130. For example, when CLKN and CLKPQ are low and CLKP and CLKNQ are high (e.g., period 253 in FIG. 2B), M2, M3, M5, and M6 are conducting, thereby placing the input latch 130d in the transparent state. In this case, M1 and M4 together act as an inverter, and the internal node 440 has the inverse value of the input data terminal 132, and the output terminal 134 has the same value as the input data terminal 132, that is, the input latch 130d is in the transparent state, and a data value (inverse to that of the input terminal 132) is latched at the internal node 440.

At the end of the period 253 shown in FIG. 2B, CLKP transitions to the low value and CLKN transition to the high value, thus M5 and M2 are turned off (e.g., in a high-impedance state), thereby placing the input latch 130d in the hold state. In this case, the internal node 440 is tri-stated, and the data value previously stored at the internal node 440 (e.g., the electrical potential of the internal node 440) is maintained, irrespective of changes in the input data on the input data terminal 132. Thus, the output terminal 134 maintains the same value it held at the end of the period 253, irrespective of changes in the input data on the input data terminal 132.

Although not shown in the example of FIG. 2B, in cases where the phase difference 254 is greater than half the period of the clock signals 120, the input latch 130d can transition from the transparent state to the holding state when CLKPQ transitions to the high value and CLKNQ transitions to the low value, thereby turning off M3 and M6. In this case, the internal node 440 is tri-stated, the data value previously stored at the internal node 440 is maintained, and the data value of the output terminal 134 is maintained, irrespective of changes in the input data on the input data terminal 132.

In the example of FIG. 4, the input latch 130 is implemented as a CMOS D-latch with modified enable logic. Other implementations of the input latch 130 are possible. In some embodiments, the input latch 130 is implemented as a dynamic transmission gate edge-triggered latch with modified enable logic, a dual-edge latch with modified enable logic, and/or any other suitable latching circuit.

In the examples of FIGS. 3 and 4, the input latch 130 and output latch 150 are described as single-bit latches, which store, receive, and transmit a single bit of data. In some embodiments, the input latch 130 and the output latch 150 are N-bit latches, which store, receive, and transmit N bits of data. In some embodiments, an N-bit latch is constructed by replicating the components of the single-bit latch N times, with the enable terminals of each single-bit latch being coupled to the same control signals, and the input data terminals of each of the single-bit latches being coupled to different input data signals.

In some embodiments, the differential clock signal 120b can be generated from the differential clock signal 120a by using a differential signal repeater (e.g., the differential signal repeater described in U.S. patent application Ser. No. 14/988,371, titled "System and Techniques for Repeating Differential Signals", filed on Jan. 5, 2016, which is incorporated herein by reference to the maximum extent permitted by applicable law). FIG. 5 shows a block diagram of a differential signal repeater 500, according to some embodiments. The differential signal repeater receives as input a signal pair on input terminals 502 and 504, and provides as output a signal pair on output terminals 506a and 506b. In some embodiments, the input terminals 502 and 504 are coupled to receive the components of the differential clock signal 120a (e.g., differential signal pair CLKP and CLKN), and the signal repeater 500 is configured to provide the components of the differential clock signal 120b (e.g., differential signal pair CLKPQ and CLKNQ) on output terminals 506a and 506b.

When CLKP and CLKN have complementary values, the differential signal repeater 500 operates to provide, at output terminals 506a and 506b, a pair of output differential signals CLKPQ and CLKNQ with complementary values. In some embodiments, when CLKP and CLKN have complementary values, the values of CLKPQ and CLKNQ are the inverses of the values of CLKP and CLKN, respectively. When the input signals (CLKP and CLKN) represent non-complementary values, the differential signal repeater 500 places the output terminals (506a, 506b) in a high-impedance state. As described in U.S. patent application Ser. No. 14/988,371, the differential signal repeater 500 can, in some embodiments, switch the components (CLKPQ, CLKNQ) of the output differential signal (clock signal 120b) only after both components (CLKP, CLKN) of the input differential signal (clock signal 120a) switch.

Since the differential signal repeater 500 can accommodate scenarios in which input differential signals CLKP and CLKN do not switch at the same time (or within a specified time window), the differential signal repeater 500 can tolerate variations (e.g., manufacturing process variations) that may cause either of the input differential signals to switch at a later time than its complementary counterpart, or outside a specified time window relative to the switching of its counterpart. Even when one of the input differential signals switches later than the other input differential signal (e.g., outside a specified time window relative to the switching of the other input differential signal), the differential signal repeater 500 can switch the output differential signals at the same time or approximately the same time (e.g., within a specified time window of each other). Thus, the output differential signals of the differential signal repeater 500 can be less skewed than the signal repeater's input differential signals, because the time period between complementary transitions of the differential signal repeater's output differential signals can be shorter than the time period between complementary transitions of the differential signal repeater's input differential signals. As discussed below in reference to FIG. 6, a set of differential signal repeaters 500 can be used to propagate differential clock signals throughout multiple components of a mesochronous system, thereby preventing, counteracting, or correcting skewing of the differential clock signals. Preventing, counteracting, or correcting the skewing of a differential signal may be referred to herein as "skew-limiting" the differential signal.

Figure 6:
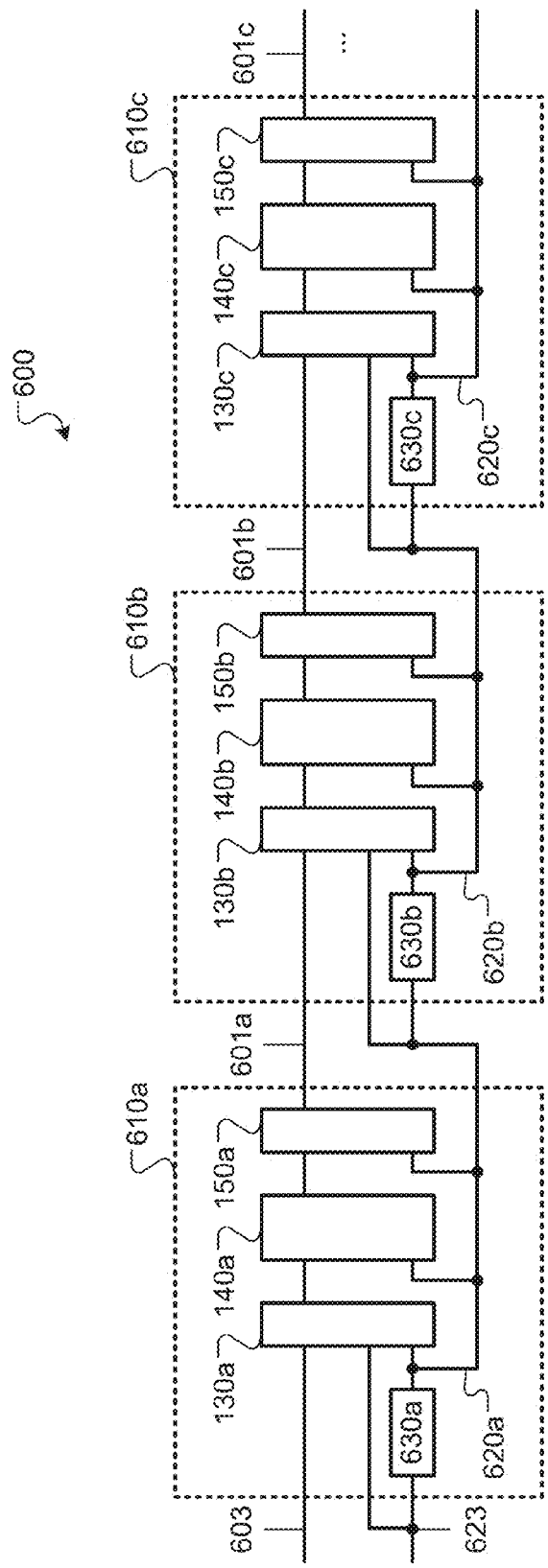
FIG. 6 is a block diagram of a chain of processing units, according to some embodiments.

FIG. 6 shows a chain 600 of processing units 610, according to some embodiments. The chain 600 includes a plurality of processing units 610a, 610b, 610c, and so on. In some embodiments, the processing units 610 in the chain 600 may be laid out in a row or in a column. Any suitable number of processing units may be included in the chain 600, for example, two or more processing units, or between 2 and 300 processing units, or between 20 and 30 processing units, or 25 processing units, etc. Each processing unit includes a processing circuit (e.g., 140a, 140b, or 140c). As described earlier, each processing circuit can be a circuit processing data and/or instructions. The processing units in the chain 600 can be the same or different types of processing circuits. In some embodiments, each processing unit includes an input latch (e.g., 130a-c), an output latch (e.g., 150a-c), and a clock buffer (e.g., 630a-c).

In the example of FIG. 6, input data 603 (e.g., a single bit of data or multiple bits of data) and a clock signal 623 (e.g., a differential clock signal) are provided to the input terminals of the first processing unit 610a. The clock buffer 630a buffers the clock signal 623 to generate a clock signal 620a that is phase-shifted relative to the clock signal 623. The input latch 130a latches the input data based on the state of the input clock signal 623 and the state of the phase-shifted clock signal 620a, as described above. The processing circuit 140a processes the latched input data in cadence with the clock signal 620a. Also in cadence with the clock signal 620a, the output latch 150a latches processed data and transmits the processed data 601a to the input terminal of the second processing unit 610b. The clock buffer 630a also provides the clock signal 620a to an input terminal of the processing unit 610b. One of ordinary skill in the art will appreciate that the latches and signal repeaters of processing units 610b and 610c can operate in the same manner as the corresponding latches and signal repeaters of processing unit 610a.

As described above, the operation of each input latch 130, processing circuit 140, and output latch 150 can be synchronized to one or more clock signals. In some embodiments, the clock signals 623 and 620a-c may be single-ended clock signals, and the clock buffers 630a-c may be inverters. In some embodiments, the clock signals 623 and 620a-c may be differential clock signals, and the clock buffers 620a-c may be differential signal repeaters 500. In some embodiments, the processing circuit 140a and output latch 150a of the first processing unit 610a of the chain 600 are synchronized to the clock signal 620a, the processing circuit 140b and output latch 150b of the processing unit 610b are synchronized to the clock signal 620b, and the processing circuit 140c and the output latch 150c of the processing unit 610c are synchronized to the clock signal 620c. In some embodiments, the input latch 130a is synchronized to a logical combination of the clock signals 623 and 620a, the input latch 130b is synchronized to a logical combination of the clock signals 620a and 620b, and the input latch 130c is synchronized to a logical combination of the clock signals 620b and 620c.

As just one example of communication between processing units 610 in the chain 600, the output latch 150a is coupled to the input latch 130b. After the clock signal 620a switches (e.g., at the beginning of the period 251 in FIG. 2B), the clock signal 620b also switches (e.g., at the beginning of the period 253 in FIG. 2B). During the period when signal CLKP of the differential clock signal 620a is high and signal CLKPQ of the differential clock signal 620b is low, the input latch 130b can be in the transparent state (and therefore can be ready to receive the output data 601a from the output latch 150a), and the output latch 150a can be in the hold state (and therefore can be transmitting the output data 601a to the input latch 130b).

In some embodiments, as a special case, the first processing unit 610a in the chain 600 may omit the input latch 130a and the clock buffer 630a. In place of the input latch 130a, the first processing unit 610a may include a conventional input latch, and in place of the clock buffer 630a, the first processing unit 610a may provide the input clock signal 623 to the second processing unit 610b without repeating the signal. This implementation has the advantage of reducing the size of the first processing unit 610a in the chain, and may be feasible when the circuit that provides the input data 603 and the clock signal 623 to the first processing unit 610a is in the same clock domain as the first processing unit 610a.

Figure 7:
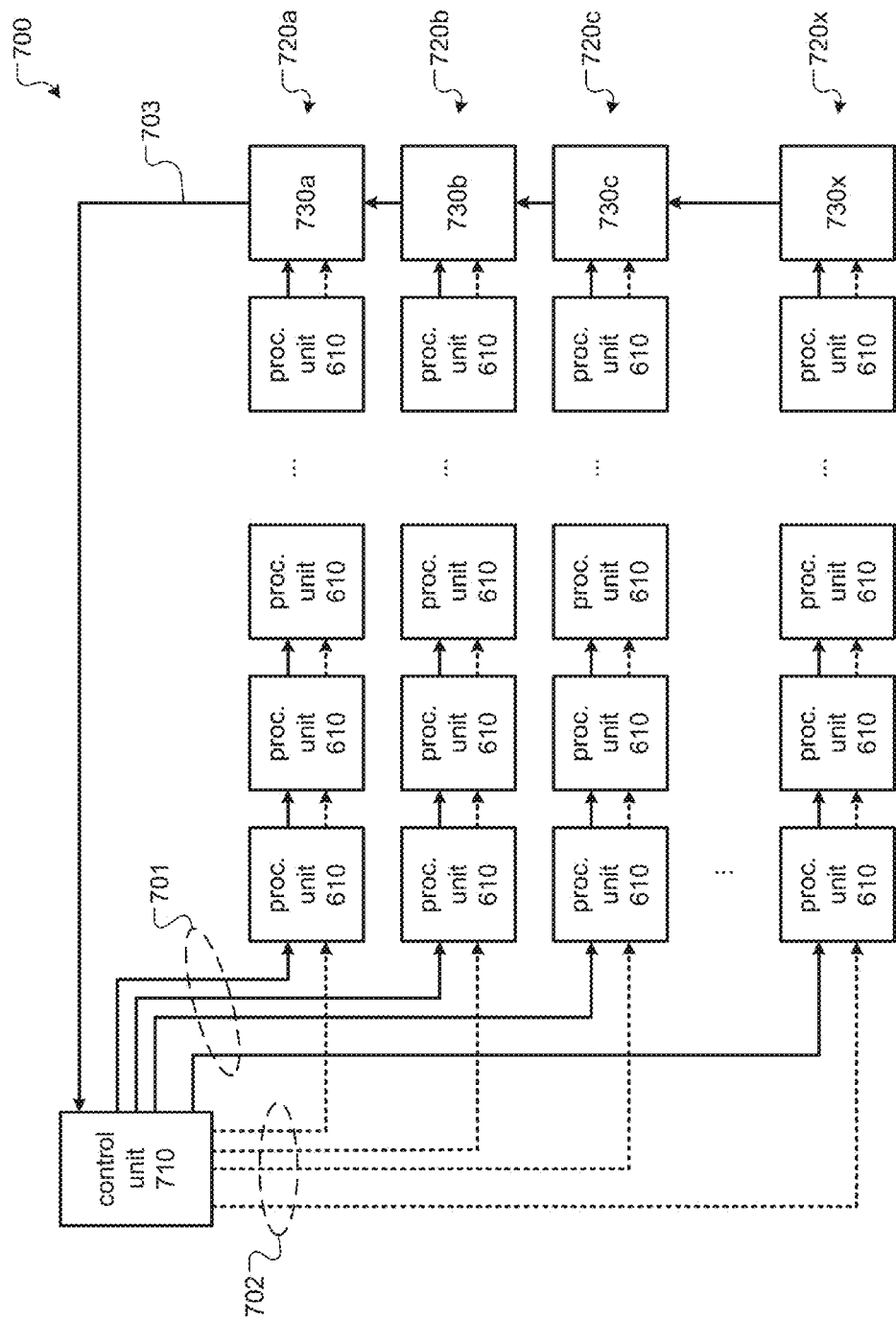
FIG. 7 is a block diagram of another mesochronous system, according to some embodiments.

FIG. 7 shows another mesochronous system 700, according to some embodiments. The system 700 includes a control unit 710 and multiple processing nodes (720a, 720b, 720c, and so on). Each processing node 720 can include a chain 600 of processing units 610, for example. In some embodiments, each processing node 720 includes a communication unit 730 that passes data between the processing node 720 and the control unit 730. In the example of FIG. 7, the communication units 730 send output data 703 from the processing nodes 720 to the control unit 710. Alternatively or in addition, the communication units 730 can send input data 701 and/or clock signals 702 from the control unit 710 to the processing nodes 720. In some embodiments, the communication units 730 implement a bus (e.g., a serial bus) between the control unit 710 and the processing nodes 720. The bus can be unidirectional or bidirectional. In some embodiments, each processing unit in a processing node 720 can be coupled to the processing node's communication unit 730by one or more data lines, and can transmit output data directly to the communication unit 730 through the data line(s).

In the example of FIG. 7, the control unit provides input data 701 and a clock signal 702 to each processing node 720 (e.g., to the first processing unit 610 in the processing node's chain of processing units). In some implementations, each processing node 720 can include a data latch to buffer input data from the control unit.

The control unit 710 and the processing nodes 720 can be organized in any suitable topology. For instance, the communication units 730 can be placed in a column in the center of the chip, with a chain of processing units forming a row on either side of each bus unit. Other organization of the control unit and processing nodes are possible.

The mesochronous system 700 can perform any suitable computational task. For instance, the mesochronous system 700 can perform bitcoin mining tasks. In some embodiments, each processing node performs a hashing operation with a random number ("nonce") to determine whether the hash value matches a given number. Each processing unit in the processing node performs part of the hashing operation using output data from the previous processing unit in the processing node. Other processing tasks are possible. Each processing unit in a processing node can operate based on the data and clock signal provided by the previous processing unit in the processing node, such that there no system-wide clock is required. As each processing unit's clock signal is automatically generated from the previous processing unit's clock signal (e.g., using an inverter or the differential signal repeater described above), the clock signal can propagate through different processing nodes at different rates, for example, due to manufacturing process variations.

Electronic Design Automation (EDA) Tools

In some embodiments, an electronic design automation (EDA) tool may be configured to facilitate design, simulation, verification, and manufacturing of mesochronous circuits using the techniques described herein. In general, EDA tools are used to design, simulate, verify, and/or prepare for manufacturing of electronic systems (e.g., integrated circuits, printed circuit boards, etc.).

Figure 8:
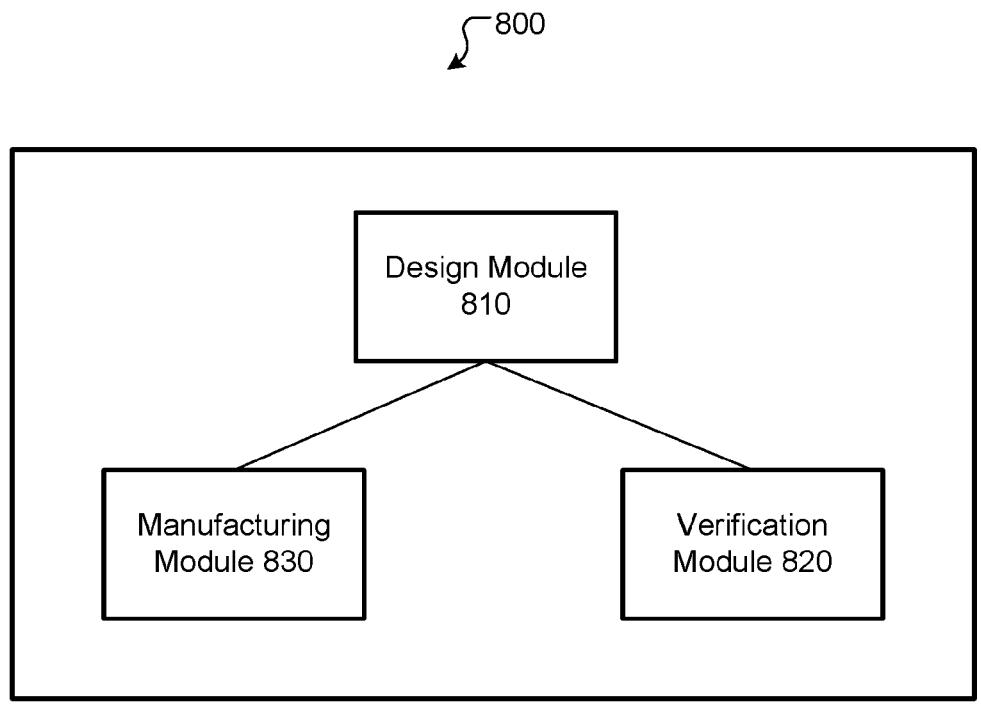
FIG. 8 is a block diagram of an electronic design automation (EDA) tool, according to some embodiments.

As shown in FIG. 8, some embodiments of an EDA tool 800 can include one or more modules, for example, a design module 810, a verification module 820, and/or a manufacturing module 830. The design module 810 can be operable to perform one or more design steps, including, without limitation, a system design step, a logic design step, a circuit synthesis step, a floor planning step, and/or a physical implementation step. In the system design step, the design module 810 may receive (e.g., from a user) a description of the functionality to be implemented by the system, and may perform hardware-software architecture partitioning of the described functionality. Examples of EDA software tools from Synopsys, Inc. that can be used to perform the system design step include Model Architect, Saber, System Studio, and DesignWare® products.

In the logic design step, the design module 810 may obtain a high-level logical description of the system (e.g., a description of the system in a hardware design language (HDL), including, but not limited to Verilog or VHDL). In some embodiments, the design module 810 generates the logical description of the system (or portions thereof) based on the functional description of the system. In some embodiments, the design module 810 receives the logical description of the system (or portions thereof) from a user. Examples of EDA software tools from Synopsys, Inc. that can be used to perform the logic design step include VCS, VERA, DesignWare®, Magellan, Formality, ESP and LEDA products.

In the synthesis step, the design module 810 may translate the high-level logical description of the system into a circuit schematic, which may be represented by a netlist or any other suitable description of a circuit's components and connections there between. In some embodiments, this synthesis step can include selection of one or more library cells to perform logic functions specified in the high-level logical description of the circuit. In some embodiments, the schematic can be customized for a particular IC technology (e.g., the IC technology that will be used to implement the system). Examples of EDA software tools from Synopsys, Inc. that can be used to perform the synthesis step include Design Compiler®, Physical Compiler, DFT Compiler, Power Compiler, FPGA Compiler, TetraMAX, and DesignWare® products.

In the floor planning step, the design module 810 may generate a floor plan for an IC that will implement the system or a portion thereof. Examples of EDA tools from Synopsys, Inc. that can be used to perform the floor planning step include Astro and Custom Designer products.

In the physical implementation step, the design module 810 may generate a representation of a physical implementation of the system (e.g., a physical layout of the components of the system on an IC). Generating the representation of the system's physical implementation may include "placing" the circuit's components (determining positions on the IC for the circuit's components) and routing the circuit's connections (determining the positions on the IC of the electrical conductors coupling the circuit's components). In some embodiments, this physical implementation step can include selection of one or more library cells to implement circuit components included in the circuit schematic. Examples of EDA tools from Synopsys, Inc. that can be used to perform the physical implementation step include the Astro, IC Compiler, and Custom Designer products.

Returning to FIG. 8, the verification module 820 may be operable to perform one or more verification steps, including, without limitation, a simulation step, a functional verification step, a schematic verification (e.g., netlist verification) step, a transistor-level verification step, a floor plan verification step, and/or a physical verification step. In the simulation step, the verification module 820 may simulate the operation of a representation of the system (e.g., a high-level logical description, circuit schematic, floor plan, or layout of the system).

In the functional verification step, the verification module 820 checks the high-level logical description of the system for functional accuracy. For example, the verification module 820 may simulate the operation of the high-level logical description of the circuit in response to particular inputs to determine whether the logical description of the circuit produces correct outputs in response to the inputs. Examples of EDA tools from Synopsys, Inc. that can be used at the functional verification step include VCS, VERA, DesignWare®, Magellan, Formality, ESP and LEDA products.

In the schematic verification step, the verification module 820 checks the system schematic (e.g., the system netlist) for compliance with applicable timing constraints and for correspondence with the high-level logical description of the circuit. Example EDA tools from Synopsys, Inc. that can be used at the verification step include Formality, PrimeTime, and VCS products.

In the transistor-level verification step, the verification module 820 checks a transistor-level representation of the system for compliance with applicable timing constraints and for correspondence with the high-level logical description of the circuit. Examples of EDA tools from Synopsys, Inc. that can be used at the transistor-level verification step include AstroRail, PrimeRail, PrimeTime, and Star-RCXT products.

In the floor plan verification step, the verification module 820 checks the floor plan of the system for compliance with applicable constraints (e.g., timing, top-level routing, etc.).

In the physical verification step, the verification module 820 checks the representation of the physical implementation of the system (e.g., a physical layout of the system components on an IC) for compliance with manufacturing constraints, electrical constraints, lithographic constraints, and/or schematic constraints. The Hercules product from Synopsys, Inc., is an example of an EDA tool that can be used at the physical verification step.

Returning to FIG. 8, the manufacturing module 830 may be operable to perform one or more steps to prepare for manufacturing the system, including, without limitation, a tape-out step and/or a resolution enhancement step. In the tape-out step, the manufacturing module 830 generates tape-out data to be used (e.g., after lithographic enhancements are applied) for production of masks for lithographic fabrication of ICs that implement the system. Examples of EDA tools from Synopsys, Inc. that can be used at the tape-out step include the IC Compiler and Custom Designer families of tools.

In the resolution enhancement step, the manufacturing module 830 may perform geometric manipulations of the system's physical layout to improve manufacturability of the IC. Examples of EDA software products from Synopsys, Inc. that can be used at this resolution enhancement step include Proteus, ProteusAF, and PSMGen tools.

An EDA tool may perform an EDA method including one or more (e.g., all) of the above-described design, verification, and/or manufacturing steps in any suitable order. In some embodiments, one or more of the design, verification, and/or manufacturing steps may be performed iteratively (e.g., until the tool determines that the system satisfies particular constraints and/or passes particular tests).

In some embodiments, one or more EDA tools can be used to design, verify, and/or fabricate a mesochronous system 100 or portions thereof. For example, an EDA tool may be used to synthesize a circuit schematic of a mesochronous system (or portions thereof) (e.g., based on a logical description of the system or portions thereof). In some embodiments, the synthesized schematic may include an output latch 150 in the first processing unit and an input latch 130 in the second processing unit, with the output data terminal of the output latch coupled to the input data terminal of the input latch. As another example, an EDA tool may generate a representation of a physical implementation of the system (e.g., a physical layout of the components of the system on an IC), including the output latch 150 of the first processing unit and the input latch 130 of the second processing unit. As another example, an EDA tool may generate lithographic masks suitable for fabricating the physical implementation of the mesochronous system, including the output latch 150 and the input latch 130. In some embodiments, these lithographic masks can be used with one or more process technologies to fabricate an IC that implements the mesochronous system.

Further Description of Some Embodiments

Some embodiments of an EDA tool 800 (or modules thereof, or methods, steps, or operations performed by an EDA tool 800 or modules thereof) can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Some embodiments of the methods, steps, and tools described in the present disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of the processes and logic flows described in this disclosure can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Figure 9:
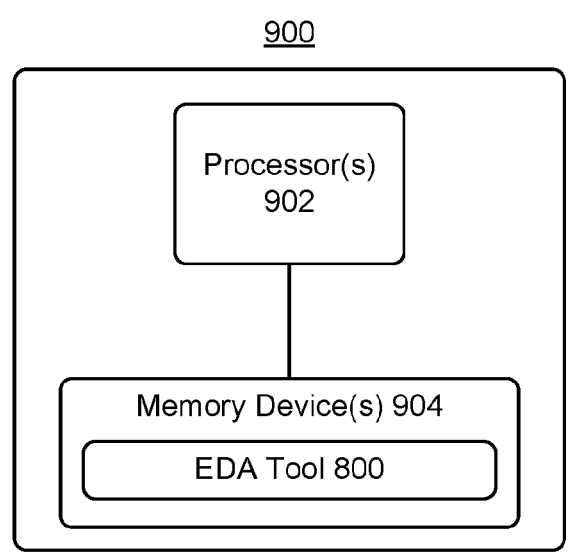
FIG. 9 is a block diagram of a computer, according to some embodiments.

FIG. 9 shows a block diagram of a computer 900. The elements of the computer 900 include one or more processors 902 for performing actions in accordance with instructions and one or more memory devices 904 for storing instructions and data. In some embodiments, the computer 900 executes an EDA tool 800. Different versions of the EDA tool 800 may be stored, distributed, or installed. Some versions of the software may implement only some embodiments of the methods described herein.

Generally, a computer 800 will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this disclosure contains many specific implementation details, these should not be construed as limitations on the scope of any inventions or of what may be claimed, but rather as descriptions of features specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

TERMINOLOGY

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An integrated circuit, comprising:
a plurality of processing units operable to synchronize respective processing to a respective plurality of mesochronous clock signals, the mesochronous clock signals including a first clock signal and a second clock signal, the first and second clock signals having a same frequency and different phases, respectively, the processing units including a first processing unit operable to synchronize processing to the first clock signal and a second processing unit operable to synchronize processing to the second clock signal,
wherein the second processing unit includes a latch circuit coupled to receive data from the first processing unit, and wherein the latch circuit is configured to operate based on states of the first and second clock signals, and
wherein the second processing unit further includes a clock buffer operable to receive the first clock signal from the first processing unit and to generate the second clock signal by shifting a phase of the first clock signal by an amount less than one clock period of the first clock signal.

2. The integrated circuit of claim 1, wherein the first processing unit includes a latch circuit coupled to provide the data to the latch circuit of the second processing unit.

3. The integrated circuit of claim 2, wherein the latch circuit of the second processing unit is configured to operate in a transparent state based, at least in part, on the latch circuit of the first processing unit being in a holding state.

4. The integrated circuit of claim 2, wherein the latch circuit of the second processing unit is configured to operate in a transparent state based, at least in part, on the latch circuit of the first processing unit being in a holding state and the second clock signal representing a particular logical value.

5. The integrated circuit of claim 4, wherein the latch circuit of the second processing unit is configured to operate in a holding state based, at least in part, on the latch circuit of the first processing unit being in a transparent state and/or the second clock signal representing a logical value different from the particular logical value.

6. The integrated circuit of claim 2, wherein the latch circuit of the first processing unit is configured to operate in a holding state based on the first clock signal representing a particular logical value, and wherein the latch circuit of the second processing unit is configured to operate in a transparent state based, at least in part, on the first clock signal representing the particular logical value.

7. The integrated circuit of claim 2, wherein the latch circuit of the first processing unit is configured to operate in a holding state based on the first clock signal representing a first logical value, and wherein the latch circuit of the second processing unit is configured to operate in a transparent state based, at least in part, on the first clock signal representing the first logical value and the second clock signal representing a second logical value.

8. The integrated circuit of claim 7, wherein the latch circuit of the second processing unit is configured to operate in a holding state based, at least in part, on the first clock signal representing a logical value different from the first logical value and/or the second clock signal representing a logical value different from the second logical value.

9. The integrated circuit of claim 1, wherein the first clock signal is a first single-ended clock signal, and the second clock signal is a second single-ended clock signal.

10. The integrated circuit of claim 9, wherein the latch circuit includes a gated latch having an input data terminal, an enable terminal, and one or more output terminals, wherein the input data terminal is configured to receive data from the first processing unit, and wherein the enable terminal is configured to receive a logical AND of the first single-ended clock signal and an inverse of the second single-ended clock signal.

11. The integrated circuit of claim 1, wherein the first clock signal is a first differential clock signal including a first differential signal pair, and wherein the second clock signal is a second differential clock signal including a second differential signal pair.

12. The integrated circuit of claim 11, wherein the latch circuit includes an input circuit and a buffer circuit, and wherein the input circuit includes:
a first plurality of field effect transistors (FETs) of a first type including first, second, and third FETs having diffusion terminals coupled in series between a first power supply rail and an input node of the buffer circuit; and
a second plurality of field effect transistors (FETs) of a second type including fourth, fifth, and sixth FETs having diffusion terminals coupled in series between a second power supply rail and the input node of the buffer circuit,
wherein gates of the first and fourth FETs are coupled to receive the data from the first processing unit,
wherein gates of the second and fifth FETs are coupled to receive first and second signals of the first differential signal pair, respectively, and
wherein gates of the third and sixth FETs are coupled to receive first and second signals of the second differential signal pair, respectively.

13. The integrated circuit of claim 11, wherein the clock buffer is a differential clock buffer having input terminals coupled to receive the first differential signal pair of the first differential clock signal, wherein generating the second clock signal comprises providing the second differential signal pair of the second differential clock signal, and wherein shifting the phase of the first clock signal by the amount less than one clock period of the first clock signal comprises setting a logical value of the second differential signal pair to match a logical value of the first differential signal pair in response to a transition of a first signal of the first differential signal pair and a complementary transition of a second signal of the first differential signal pair.

14. A latch circuit, comprising:
a buffer circuit having an input node and an output node;
an input circuit having an output node coupled to the input node of the buffer circuit, a data node coupled to receive an input data signal, and first and second enable nodes coupled to receive first and second mesochronous clock signals, respectively, of first and second processing units, respectively, the first and second clock signals having a same frequency and different phases, respectively,
wherein the input circuit is operable to enable the latch circuit based on states of the first and second mesochronous clock signals, and
wherein the second processing unit further includes a clock buffer operable to receive the first clock signal from the first processing unit and to generate the second clock signal by shifting a phase of the first clock signal by an amount less than one clock period of the first clock signal.

15. The latch circuit of claim 14, wherein the data node is coupled to receive the input data signal from an output latch of the first processing unit.

16. The latch circuit of claim 15, wherein the input circuit is configured to enable the latch circuit based, at least in part, on the output latch being in a disabled state.

17. The latch circuit of claim 15, wherein the input circuit is configured to enable the latch circuit based, at least in part, on the output latch being in a disabled state and the second clock signal representing a particular logical value.

18. The latch circuit of claim 17, wherein the input circuit is configured to disable the latch circuit based, at least in part, on the output latch being in an enabled state and/or the second clock signal representing a logical value different from the particular logical value.

19. The latch circuit of claim 15, wherein the output latch is configured to operate in a disabled state based on the first clock signal representing a particular logical value, and wherein the input circuit is configured enable the latch circuit based, at least in part, on the first clock signal representing the particular logical value.

20. The latch circuit of claim 14, wherein the first clock signal is a first differential clock signal including a first differential signal pair, and wherein the second clock signal is a second differential clock signal including a second differential signal pair.

21. The latch circuit of claim 20, wherein the input circuit includes:
a first plurality of field effect transistors (FETs) of a first type including first, second, and third FETs having diffusion terminals coupled in series between a first power supply rail and the input node of the buffer circuit; and
a second plurality of field effect transistors (FETs) of a second type including fourth, fifth, and sixth FETs having diffusion terminals coupled in series between a second power supply rail and the input node of the buffer circuit,
wherein gates of the first and fourth FETs are coupled to receive the input data signal,
wherein gates of the second and fifth FETs are coupled to receive first and second signals of the first differential signal pair, respectively, and
wherein gates of the third and sixth FETs are coupled to receive first and second signals of the second differential signal pair, respectively.

22. A communication method for a mesochronously clocked system, comprising:
synchronizing processing of first and second processing units to first and second mesochronous clock signals, respectively, the first and second mesochronous clock signals having a same frequency and different phases, respectively,
sending data and the first clock signal from the first processing unit to the second processing unit,
generating the second clock signal in the second processing unit by shifting a phase of the first clock signal by an amount less than one clock period of the first clock signal, and
enabling or disabling receipt of the data by the second processing unit based, at least in part, on states of the first and second mesochronous clock signals.

23. The method of claim 22, wherein enabling or disabling receipt of the data by the second processing unit based on states of the first and second mesochronous clock signals comprises: enabling receipt of the data by the second processing unit based, at least in part, on an output latch of the first processing unit being disabled.

24. The method of claim 22, wherein enabling or disabling receipt of the data by the second processing unit based on states of the first and second mesochronous clock signals comprises: enabling receipt of the data by the second processing unit based, at least in part, on an output latch of the first processing unit being disabled and the second clock signal representing a particular logical value.

25. The method of claim 22, wherein the first mesochronous clock signal is a first differential clock signal including a first differential signal pair, and wherein the second mesochronous clock signal is a second differential clock signal including a second differential signal pair.

26. The method of claim 25, wherein generating the second clock signal comprises generating the second differential signal pair of the second differential clock signal, including setting a logical value of the second differential signal pair to match a logical value of the first differential signal pair in response to a transition of a first signal of the first differential signal pair and a complementary transition of a second signal of the first differential signal pair.

27. A computer-implemented electronic design automation method comprising:
synthesizing, by a computer, a circuit schematic of a portion of a mesochronous system, the mesochronous system including a plurality of processing units operable to synchronize respective processing to a respective plurality of mesochronous clock signals, the mesochronous clock signals including a first clock signal and a second clock signal, the first and second clock signals having a same frequency and different phases, respectively, the processing units including a first processing unit operable to synchronize processing to the first clock signal and a second processing unit operable to synchronize processing to the second clock signal, the second processing unit coupled to receive data from the first processing unit,
wherein synthesizing the circuit schematic includes:
generating a schematic of a latch circuit of the second processing unit, the latch circuit being coupled to receive data from the first processing unit and configured to operate based on states of the first and second clock signals, and
generating a schematic of a clock buffer of the second processing unit, the clock buffer being operable to receive the first clock signal from the first processing unit and to generate the second clock signal by shifting a phase of the first clock signal by an amount less than one clock period of the first clock signal.

28. The method of claim 27, further comprising simulating, by a computer, operation of the circuit schematic, including simulating operation of the latch circuit.

29. The method claim 27, further comprising generating, by a computer, a physical layout of the circuit schematic.

30. The method claim 29, further comprising generating, by a computer, a plurality of mask patterns for fabricating an integrated circuit including the latch circuit.

* * * * *